(12) United States Patent
Henderson

(10) Patent No.: US 7,815,158 B2
(45) Date of Patent: Oct. 19, 2010

(54) DOUBLED-HINGED, HOIST-MOUNTED WHEEL HANGER

(76) Inventor: Gregory James Henderson, 21867 River Road, Maple Ridge, British Columbia (CA) V2X 2B9

( * ) Notice: Subject to any disclaimer, the term of this patent is extended or adjusted under 35 U.S.C. 154(b) by 417 days.

(21) Appl. No.: 11/774,354

(22) Filed: Jul. 6, 2007

(65) Prior Publication Data

US 2008/0031713 A1   Feb. 7, 2008

Related U.S. Application Data

(60) Provisional application No. 60/767,551, filed on Jul. 7, 2006.

(51) Int. Cl.
*E04G 3/00* (2006.01)
(52) U.S. Cl. .................................. 248/278.1
(58) Field of Classification Search ............ 248/289.11, 248/278.1, 279.1, 282.1, 284.1, 291.1; 451/920
See application file for complete search history.

(56) References Cited

U.S. PATENT DOCUMENTS

| | | | |
|---|---|---|---|
| 4,470,106 A * | 9/1984 | Norton | 362/398 |
| 5,618,228 A | 4/1997 | Anderson | |
| 6,478,275 B1 * | 11/2002 | Huang | 248/284.1 |
| 6,604,610 B2 | 8/2003 | Starling | |
| 6,681,897 B2 | 1/2004 | Gibson | |
| 6,793,187 B2 * | 9/2004 | McGee | 248/289.11 |
| 7,073,778 B2 | 7/2006 | Gibson | |
| 7,510,155 B2 * | 3/2009 | Huang et al. | 248/278.1 |
| 2003/0155475 A1 | 8/2003 | Hicks | |
| 2009/0008524 A1 * | 1/2009 | Huang et al. | 248/278.1 |
| 2009/0090831 A1 * | 4/2009 | Henning et al. | 248/278.1 |

* cited by examiner

*Primary Examiner*—Ramon O Ramirez
(74) *Attorney, Agent, or Firm*—Vermette & Co.

(57) ABSTRACT

There is provided a double-hinged wheel hanger for hanging a wheel on a hoist arm. The wheel hanger includes a clevis with parallel top plate and bottom plate connected by a perpendicular base plate. In one preferred embodiment the distance between the top plate and the bottom plate is substantially the same as the height dimension of the hoist arm so that the hoist arm can be received between the top plate and the bottom plate. The wheel hanger has an elongate support arm. A proximal end of the support arm is rotatably received by a recess in a distal end of an arm-connector. A proximal end of the arm-connector is rotatably received between the top plate and the bottom plate of the clevis by means of a vertical hinge. The support arm is rotatable both in the horizontal plane and the vertical plane.

9 Claims, 5 Drawing Sheets

DOUBLED-HINGED, HOIST-MOUNTED WHEEL HANGER

FIELD

The present invention relates to a wheel hanger mounted on a vehicle hoist arm and onto which a wheel removed from a vehicle can be supported.

BACKGROUND

The term "wheel" is used in the following disclosure and claims to include rims, tires, and rim-tire assemblies. As the invention can be used to support wheels, tires, and rims, these terms can be used interchangeably within the intended scope of the claims.

The numbers of back injuries to employees in the automotive service has been increasing dramatically due to the increasing weight of tires and rims, particularly with large SUVs and trucks. In the process of servicing brakes or rotating tires, a vehicle is raised to 4 or 5 feet from the ground by a hoist. The wheel is taken off of the car and dropped to the ground. It is either left there or maneuvered to a tire-changing apparatus or some other device. The wheel eventually needs to be picked up off the ground, lifted up to the proper height, and replaced on the car. This requires a service person to twist and bend while lifting and positioning as much as 100 pounds. As a result, worker's compensation claims for back injuries from such activities have been skyrocketing.

There have been a number of attempts to overcome this problem. U.S. Pat. No. 5,618,228 discloses a holding fixture for a wheel in which a vertically oriented triangular plate has three bolts at its corners which pass through corresponding holes in the wheel frame and three nuts hold the wheel from falling off of the bolts. Although the concept of hanging the wheel is advantageous, the need to align three holes in a wheel assembly over three bolts that are loosely inserted through three holes in the triangular plate presents considerable challenges to even the most skilled service person.

Canadian Patent Application No. 2,402,711 discloses a wheel hanging apparatus consisting of a clamp that couples to automotive hoist at a height approximately the same as that of a wheel of a vehicle disposed on a hoist. A single pin projecting from the end of a pivotal arm serves to engage a stud hole on the wheel assembly and hold the wheel in an elevated position.

U.S. Patent Application No. 2003/0155475 by Hicks discloses a tubular wheel hanger that hangs from an automotive hoist. The wheel hanger has a U-shaped section that fits over a hoist arm and a hook at the end of a long arm on which hangs the wheel. Because the U-shaped section loosely fits over the hoist arm, no variation in size of the hoist can be tolerated.

The foregoing devices have a common shortcoming in that they cannot be safely stored when not in use, thereby posing a potential threat of injury to a worker who accidentally runs into the device.

SUMMARY OF THE INVENTION

According to the invention there is provided a wheel hanger for hanging a wheel on a hoist arm. The wheel hanger has a clevis with parallel top plate and bottom plate connected by a perpendicular base plate. In one preferred embodiment the distance between the top plate and the bottom plate is substantially the same as the height dimension of the hoist arm so that the hoist arm can be received between the top plate and the bottom plate, thereby allowing the wheel hanger to be attached to the hoist arm. The wheel hanger has an elongate arm or rod, referred to herein as a "support arm". The support arm has a proximal and a distal end. The proximal end of the support arm is rotatably received by a recess in the distal end of an arm-connector by means of a horizontal hinge. The proximal end of the arm-connector is rotatably received between the top plate and the bottom plate of the clevis by means of a vertical hinge. Consequently, the distal end of the support arm is rotatable both in the horizontal plane and the vertical plane. In operation, a wheel taken from a vehicle that has been raised on a hoist is easily placed on the support arm without a service person ever having to bend at the waist to lower the wheel to the floor or, more importantly, to pick the wheel up and lift it back to the level of the hoist. The rim of the wheel is protected from damage by a protective sleeve about the support arm. An adjustment means is provided for making fine adjustments in the position of the support rod arm.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION

Figure 1:
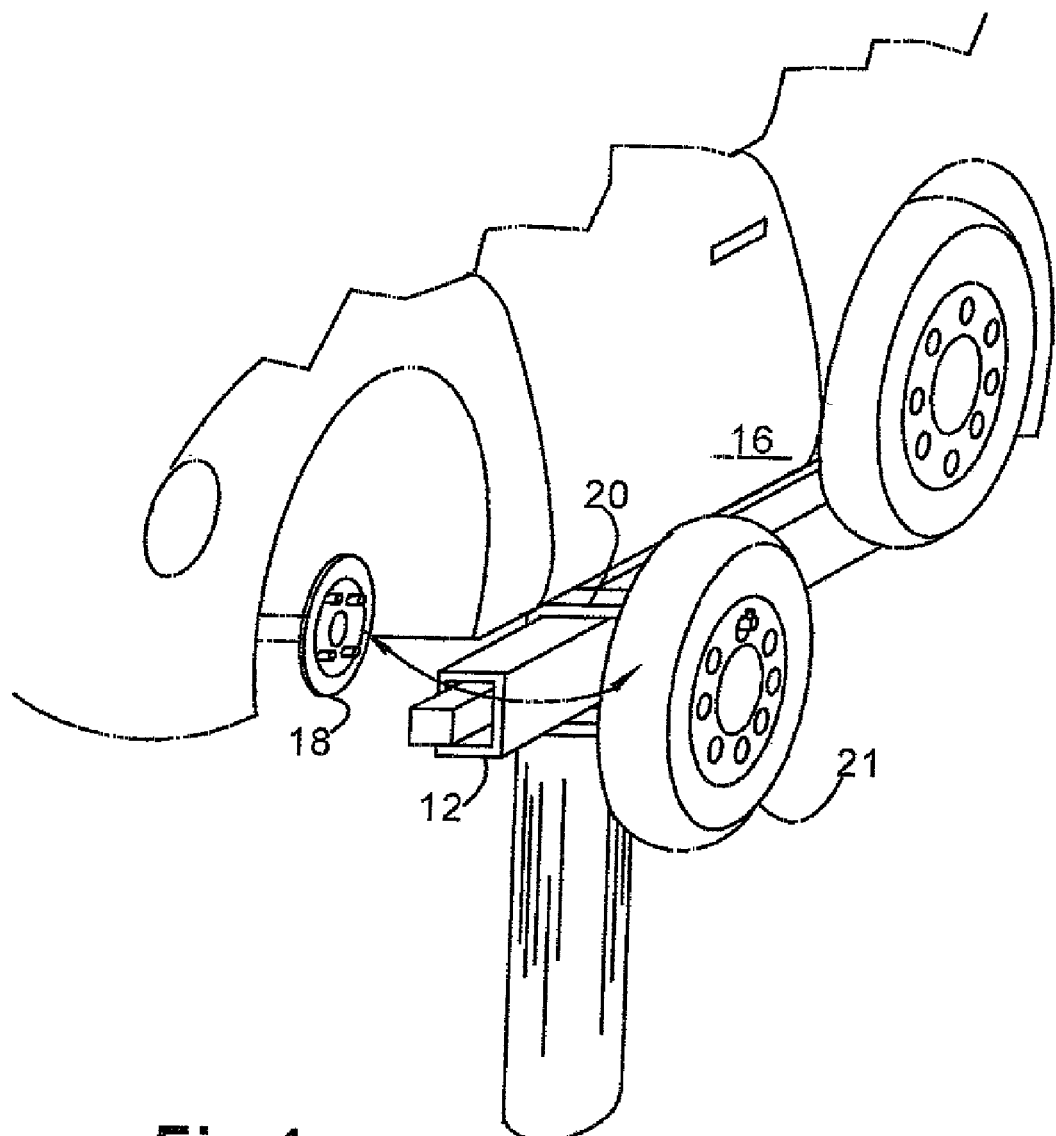
FIG. 1 is a perspective view of a portion of an automobile and hoist showing an automobile wheel stored on the invention.

Referring to FIG. 1, there is shown one hoist arm 12 of a two-post lift. The ends of the hoist arm engage the undercarriage of a vehicle 16. The clevis (see FIG. 2) of wheel hanger 20 encloses the hoist arm 12 and suspends the wheel 21 alongside the hoist arm 12. The axle 18 from which wheel 21 was removed is shown relative to the location of the wheel hanger 20.

Figure 2:
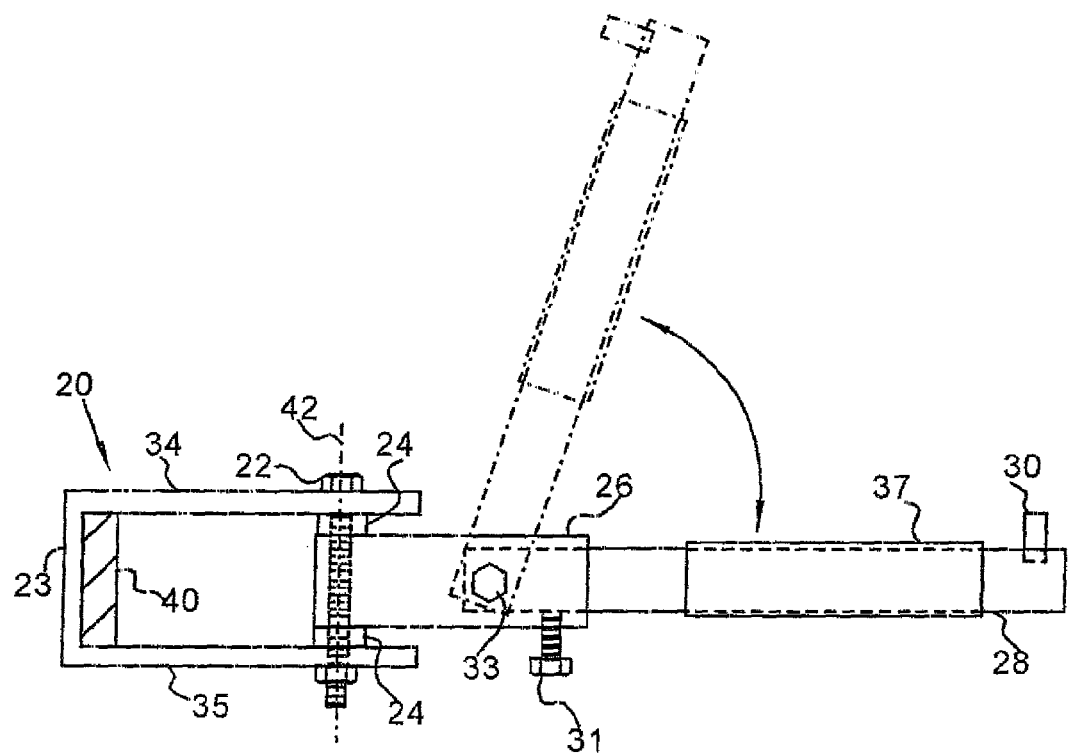
FIG. 2 is a side elevation of the wheel hanger attached to a hoist arm.

Referring to FIG. 2, which is a side elevation of the invention, it is seen that the wheel hanger comprises a clevis 20, which surrounds the hoist arm 40 on three sides. Preferably, the clevis is made of ¼" steel plate. The clevis has an upper plate 34, a lower plate 35 parallel to the upper plate, and a base plate 23, perpendicular to and connecting the upper and lower plates, thus forming a U-shaped opening. The dimensions of clevis 20 are variable depending on the size of the hoist. Specifically the distance between the top plate 34 and the bottom plate 35 is chosen to be substantially the same as the height dimension of the hoist arm 40 thereby allowing the hoist arm to be received by the clevis as shown in the figure.

A first hinge bolt 22 passes vertically through holes near the end of the upper 34 and lower 35 plates and through the proximal end of arm-connector 26, thereby forming a vertical hinge that allows the arm-connector to rotate to and fro horizontally about the vertical axis 42 defined by first hinge bolt 22. Nylon bushings 24 provide low friction contact between proximal end of arm-connector 26 and the upper plate 34 and the lower plate 35. The distal end of arm-connector 26 has a recess for receiving a support arm, as described below.

The proximal end of elongate support arm 28 is received by the recess in the distal end of the arm-connector. The proximal end of the support arm is rotatably coupled to the arm-connector 26 by second hinge bolt 33, thereby forming a horizontal hinge between the proximal end of the support arm and distal end of the arm-connector. This connection allows the support arm 28 to rotate vertically about a horizontal axis 41 (see FIG. 3) defined by second hinge bolt 33.

Because of the double-hinge formed by first hinge bolt 22 and second hinge bolt 33, the support arm rotates with respect to both the vertical axis 42 defined by the first hinge bolt 22 and a horizontal axis 41 defined by the second hinge bolt. 33 The support arm is substantially horizontal when it is being used to hold a wheel, but because of the horizontal hinge it can be raised in order to get it out of worker's way when it is not in use. The preferred range of vertical rotation is about 72 degrees from horizontal. However, various applications and needs differ and it is possible to rotate the support bar upward more than 90 degrees. Because of the vertical hinge the support arm can also be rotated horizontally against the hoist arm. The range of horizontal rotation is limited by the hoist arm, but is on the order of 190 degrees about the vertical hinge.

Plastic retainer pin 30 protrudes from the distal end of support arm 28 and serves to restrain a wheel from slipping off of the end of the support arm. An adjustment means for adjusting the support arm is provided by threaded adjusting bolt 31, which passes through arm-connector 26 and allows vertical adjustment to level support arm 28. Such adjustment is useful when natural wear occurs to nylon bushings 24 and hinge bolts 22 and 33.

As noted previously, the preferred means of connecting the invention to the hoist arm 40 is to provide a distance between the top plate 34 and the bottom plate 35 that is substantially the same as the height dimension of the hoist arm 40 such that the clevis can be slid onto the hoist arm, which is received between the top plate and the bottom plate; i.e, within the "U" of the clevis. Once the clevis is slid onto the hoist arm, first hinge bolt 22 is received through the hole of the top plate 34, the top bushing 24, the hole of the proximal end of the arm-connector 26, the bottom bushing 24, and the hole through the bottom plate 35. Bolt 22 is then snugged sufficiently tight against the resistance of the nylon bushings 24 to leverage a tight bind on the hoist arm Alternatively, the clevis can be mounted to the hoist arm by means of welding or bolting base plate 23 to the hoist arm.

As shown in FIG. 2, a protective sleeve 37 is provided to prevent damage to the inside edge of the rim when the wheel is being held by the invention. This sleeve can be made of any number of sufficiently resilient protective materials.

The preferred approach is to construct the support rod arm of inch pipe and use ¾ inch i.d. rubber tubing of soft automotive heater hose as the sleeve. This allows the sleeve to be replaced easily and frequently to minimize damage to rims.

Figure 3:
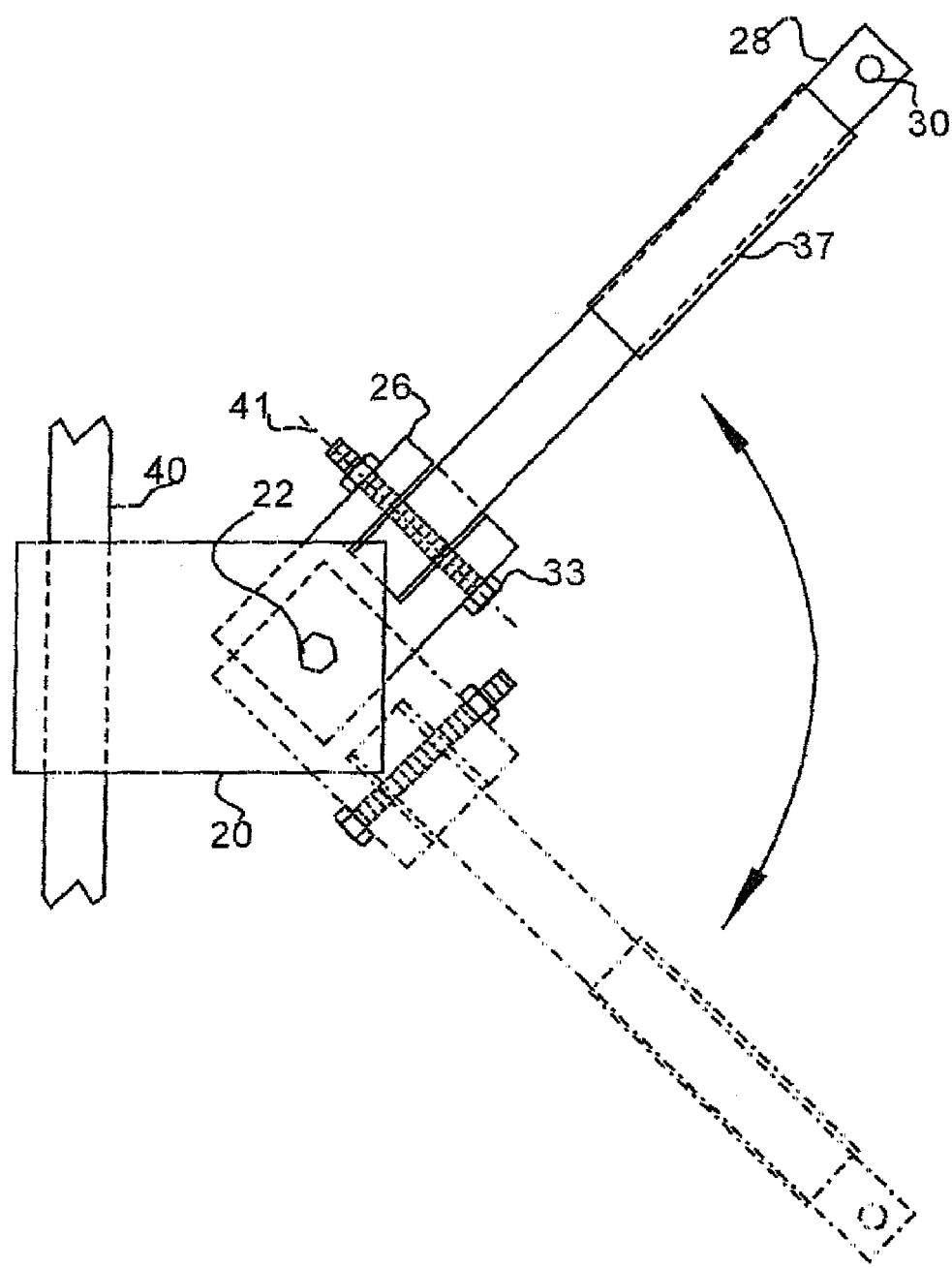
FIG. 3 is a top elevation view of the wheel hanger attached to a hoist arm.

FIG. 3 is a top elevation of the invention showing the horizontal rotation of the support arm 28 about the vertical axis 42 (see FIG. 2) defined by the first hinge bolt 22 passing through the clevis 20 and the arm-connector 26. The amount of rotation is essentially limited by the distal end of the support arm hitting the hoist arm 40. The free-play, or ease of horizontal movement, of the support arm can be adjusted by tightening or loosening first hinge bolt 22.

The ability of the support arm to move in two planes is important. First of all, this feature allows the support arm to be moved out of the way of personnel when it is not in use. Secondly, if a technician inadvertently walks into the wheel hanger from the side or contacts it from underneath, the support arm will articulate away from the direction of impact causing minimal or no injury. Or, if a technician lowers the hoist with the support arm 28 extended, and the support arm encounters an obstruction, being double hinged the support arm would articulate up and away from such obstruction.

Figure 4:
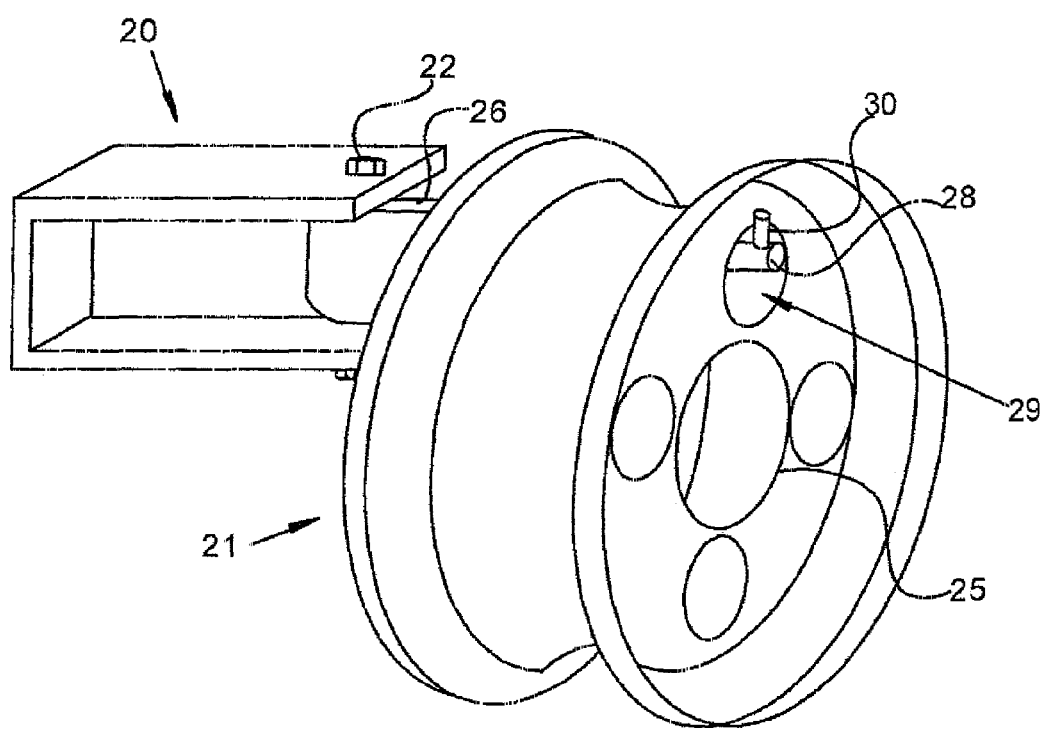
FIG. 4 is a perspective view of the wheel hanger holding a rim.
Figure 5:
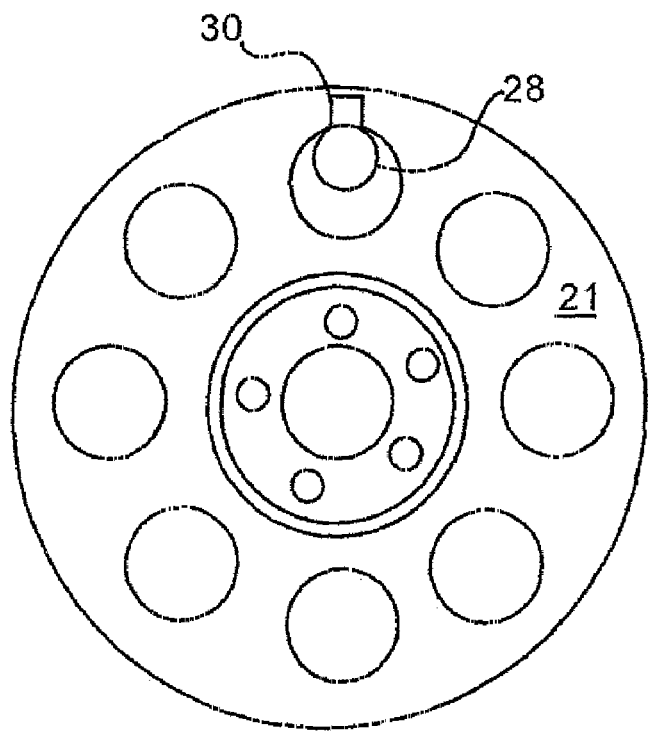
FIG. 5 is a front elevation view of the wheel hanger holding a rim.
Figure 6:
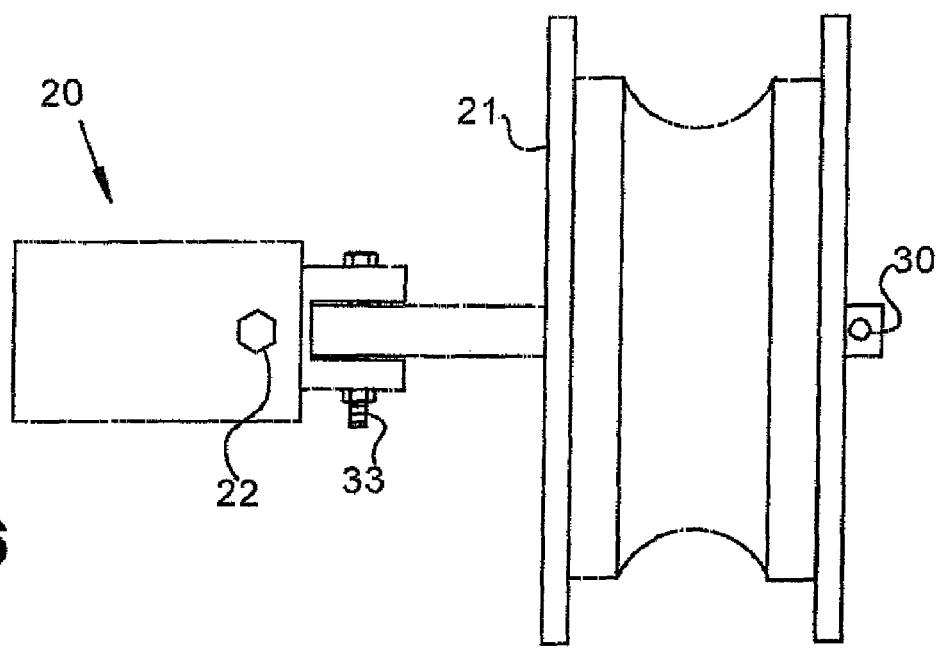
FIG. 6 is a top elevation view of the wheel hanger holding a rim.

For clarity of disclosure, FIGS. 4-6 show just a rim being held by the invention. Referring next to FIG. 4, the wheel hanger assembly 20 is shown with its support arm 28 in an extended position through a rim opening 29. Plastic retainer pin 30 engages an outer edge of the wheel rim 25. The retainer pin plays a significant safety role by making it difficult for the wheel assembly to fall off the support arm 28 in case of an accidental bumping of the wheel assembly 21.

When using the invention, support arm 28 is extended outwards and downwards into an extended horizontal position. A wheel that has been removed from a vehicle on the hoist is simply lifted over to the support arm 28 as shown in FIGS. 4 to 6. The wheel can be left on the wheel hanger 20 or moved to another wheel apparatus for further servicing. The normal number of hangers per hoist would be four, allowing the technician to remove and support all four wheels at once. If left on the support arm 28 the service person avoids having to bend over to place the wheel assembly 21 on the floor. Once the wheel has been removed from the wheel hanger 20, the support arm 28 can be rotated horizontally alongside the horizontal hoist arm without loosening bolt 22. Alternatively, support arm 28 can be pivoted upwardly as a safety mechanism without loosening hinge bolt 33.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description.

I claim:

1. A wheel hanger for hanging a wheel on a hoist arm, said wheel hanger comprising:
   a. a clevis comprising a top plate, a bottom plate, and a base plate, wherein said top plate and said bottom plate are substantially parallel to one another, and wherein said base plate is substantially perpendicular to said top plate and said bottom plate and connects said top plate and said bottom plate;
   b. a support arm having a distal end and a proximal end;
   c. an arm-connector having i) a proximal end, ii) a distal end, and iii) a recess in the distal end of said arm-connector for rotatably receiving the proximal end of said support arm;
   d. a first hinge formed between said clevis and the proximal end of said arm-connector;
   e. a second hinge formed between the distal end of said arm-connector and the proximal end of said support arm, whereby said support arm is rotatable about both of said first hinge and said second hinge; and,
   f. an attachment means for attaching said wheel hanger to the hoist arm, wherein said attachment means comprises providing the distance between said top plate and said bottom plate substantially the same as the height of the hoist arm, whereby the hoist arm is received between said top plate and said bottom plate.

2. The wheel hanger of claim 1 further comprising bushings between said arm-connector and said top plate and said bottom plate.

3. The wheel hanger of claim 1 further comprising adjustment means for vertical adjustment of said support arm.

4. The wheel hanger of claim 3, wherein said adjustment means comprises an adjusting bolt that passes through said arm-connector.

5. The wheel hanger of claim 1 further comprising adjustment means for adjusting at least one of free-play and ease of horizontal movement of said support arm.

6. The wheel hanger of claim 5 wherein said adjustment means comprises a hinge bolt passing through said clevis and said arm-connector, wherein said hinge bolt is adapted to be tightened and loosened.

7. The wheel hanger of claim 1 wherein said attachment means comprises providing the distance between said top plate and said bottom plate substantially the same as the height dimension of the hoist arm, whereby the hoist arm is received between said top plate and said bottom plate.

8. The wheel hanger of claim 1 further comprising a retainer pin protruding from the distal end of said support arm.

9. The wheel hanger of claim 1 further comprising a protective sleeve about said support arm.

* * * * *